J. L. Linderman.
Seed Sower.

No. 86,559.      Patented Feb. 2, 1869.

Witnesses:
Chas. F. Brown
S. J. Noyes

Inventor:
J. L. Linderman by
S. W. Beadle atty.

UNITED STATES PATENT OFFICE.

JAMES L. LINDERMAN, OF ROCKFORD, ILLINOIS.

IMPROVEMENT IN SEED-SOWERS.

Specification forming part of Letters Patent No. 86,559, dated February 2, 1869.

*To all whom it may concern:*

Be it known that I, JAMES L. LINDERMAN, of Rockford, in the county of Winnebago and State of Illinois, have invented new and useful Improvements in Seed-Sowers; and I do hereby declare that the following is a full and exact description of the same, reference being had to the accompanying drawings, and to the letters of reference marked thereon.

This invention relates to certain improvements in seed-sowers; and consists, mainly, in the construction of the seed-delivering wheel, and in the arrangement of the inclines and partitions in the seed-box, as will be fully described hereinafter.

To enable others skilled in the art to which my invention appertains to make and use the same, I will now proceed to describe fully the nature of my improvements and their manner of operation.

A represents the seed-box, having the partitions $a$ $a$ located as shown, by means of which the chambers $A^1$ $A^2$ are formed. $A^1$ represents the seed-chamber, which is provided with the inclined bottom B, as shown. $A^2$ represents the chamber in which the delivery-wheel revolves.

Figure 1:
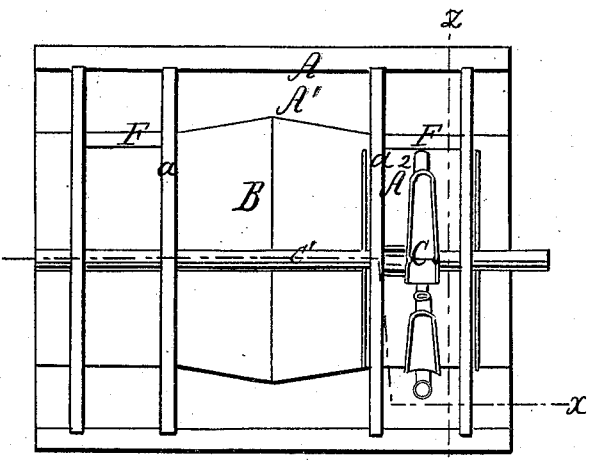
Figure 2:
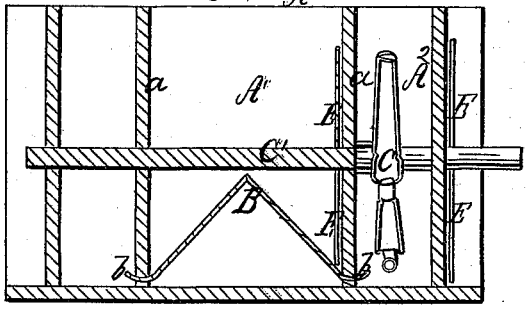
Figure 3:
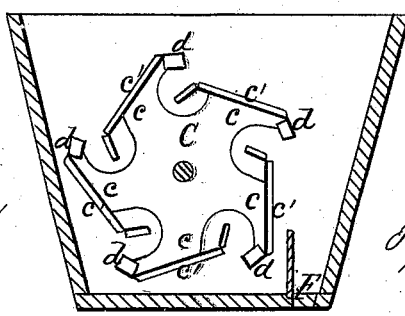

C represents the delivery-wheel, located upon the shaft $C'$, which is of peculiar construction, as shown in Figure 3. It is provided with arms $c$, the front sides of which are curving in shape and have beveled edges. Their rear sides are straight, being so arranged for the purpose of supporting the channels $c'$. These channels are tapering in form, and at their rear ends are bent in toward the center, as is shown in Fig. 3. $d$ represents the seed-cups, which are attached to the ends of the arms $c$, as shown.

It will be observed that the inclined bottom B of the seed-chamber has a projection, $b$, which, extending through the opening in the partitions $a$ $a$, through which the seed passes into the wheel-chamber, is bent in an upward direction, as is shown.

E represents rods extending from the shaft $C'$, which act, as the shaft revolves, as stirrers, to keep the grain from clogging at the openings through the partitions. F represent the delivery-spouts.

From this description the operation of my improvements will be readily understood. The seed, having been placed in the chamber $A^1$, is conducted, by means of the inclined bottom B, through the openings in partitions $a$, into the wheel-chambers upon either side. The edge $b$ of the bottom prevents the grain from passing through so rapidly as to impede the movement of the wheel, while, at the same time, the supply is ample at all times to fill the cups. The stirrers E upon the shaft prevent the openings between the chambers from being clogged. The wheel, with its sharp edges, easily passes through the seed, and, filling its cups, delivers regularly to the spouts. The construction of the wheel is such that no excess of seed can be carried up by the cups. The channels $c'$ are bent inward toward the center at their rear ends, as before described, in order that the seed may fall off on all sides, and not be heaped. If the cups should pass up with an excess of seed, such excess would be discharged upon the bent part of the seed-channel and pass back into the box.

I do not claim inclined bottoms in themselves, nor the use of partitions; but

What I do claim, and desire to secure by Letters Patent of the United States, is—

1. The delivery-wheel C, constructed substantially as described, with arms $c$, channels $c'$, and seed-cups $d$, as and for the purpose described.

2. The inclined bottoms B, with projections $b$, when arranged as described, in connection with openings in partitions $a$ $a$, as and for the purpose described.

This specification signed and witnessed this 12th day of November, 1868.

JAMES L. LINDERMAN.

Witnesses:
O. A. PENNOYER,
G. W. FORD.